United States Patent
Wininger

[19]

[11] Patent Number: 5,969,774
[45] Date of Patent: *Oct. 19, 1999

[54] PROGRAMMABLE REMOTE CONTROL TRANSMITTER

[76] Inventor: Dixon Wininger, 9 Simcoe Street, Port Dalhousie, Ontario, Canada, L2N 5C4

[*] Notice: This patent is subject to a terminal disclaimer.

[21] Appl. No.: 08/341,358

[22] Filed: Nov. 17, 1994

[51] Int. Cl.⁶ .................................................. H04N 5/44
[52] U.S. Cl. ...................... 348/734; 348/5.5; 340/825.72
[58] Field of Search ........................... 348/5.5, 734, 874; 340/825.72, 825.69; H04N 5/44

[56] References Cited

U.S. PATENT DOCUMENTS

| | | | |
|---|---|---|---|
| 4,355,415 | 10/1982 | George et al. | 455/185 |
| 4,375,651 | 3/1983 | Templin et al. | 358/191.1 |
| 4,425,579 | 1/1984 | Merrell | 358/86 |
| 4,626,848 | 12/1986 | Ehlers | 340/825.69 |
| 4,651,342 | 3/1987 | Mengel | 455/151 |
| 4,768,229 | 8/1988 | Benjamin | 348/5.5 |
| 4,802,114 | 1/1989 | Sogame | 364/900 |
| 4,835,614 | 5/1989 | Ryu | 358/194.1 |
| 4,837,627 | 6/1989 | Mengel | 358/191.1 |
| 4,870,492 | 9/1989 | Hakamada et al. | 358/193.1 |
| 5,005,084 | 4/1991 | Skinner | 348/734 |
| 5,028,919 | 7/1991 | Hidaka | 348/734 |
| 5,046,093 | 9/1991 | Wachob | 380/20 |
| 5,229,763 | 7/1993 | Nakamaru | 348/734 |
| 5,386,251 | 1/1995 | Movshovich | 348/734 |
| 5,387,942 | 2/1995 | Lemelson | 348/474 |

FOREIGN PATENT DOCUMENTS

| | | | |
|---|---|---|---|
| 20577267 | 1/1994 | European Pat. Off. | 348/734 |

OTHER PUBLICATIONS

*Home Computing & Entertainment,* "Just Out", p. 24, (author and date unknown).

*Primary Examiner*—Victor R. Kostak
*Attorney, Agent, or Firm*—Webb Ziesenheim Bruening Logsdon Orkin & Hanson, P.C.

[57] ABSTRACT

A programmable remote control transmitter has a programming mode and a controlling mode and is used to control electric devices such as television sets. The remote control transmitter has a memory for storing a limited number of remote control codes. There is a keypad for selecting one of the stored codes and a transmitter for transmitting the remote control signal corresponding to the selected remote control code to the electric device such as a television set. Remote control codes are able to be input to the memory of the remote control transmitter only when the remote control transmitter is in programming mode. In normal operation the remote control transmitter is in controlling mode. A removable key must be used to change the mode of the remote control transmitter from controlling mode to programming mode.

6 Claims, 4 Drawing Sheets

PROGRAMMABLE REMOTE CONTROL TRANSMITTER

FIELD OF THE INVENTION

This invention relates in general to a programmable remote control transmitter and more particularly to a remote control transmitter in which the ability to program the transmitter may be selectively permitted or denied.

BACKGROUND OF THE INVENTION

As the number and variety of television transmissions has increased, the need to restrict and supervise the television viewing by children has also increased. At a young age children are able to learn to use remote control transmitters to turn television sets on and off and to select channels. When parents are not present, children are able to change channels which carry programs which may not be considered appropriate for children.

Devices exist which are aimed at controlling the amount of television that a child may watch. For example Recoton Canada Ltd. markets a product having a switch which is connected between the television and the cable or antenna supplying the signal to the television. The television is only able to be operated when the switch is turned on. When the switch is off the television screen is blank. The device cannot be disconnected without the use of a key.

Such devices do not address the situation where a child is permitted to watch television but restrictions on the types of programs which the child may view are imposed by a parent or other caregiver.

Thus a programmable remote control transmitter which permits access to a programmer-defined set of television channels which set may not be altered by a child, is desirable.

SUMMARY OF THE INVENTION

An object of one aspect of the present invention is to provide an improved programmable remote control transmitter.

In accordance with one aspect of the present invention there is provided a programmable remote control transmitter for controlling an electrical device, the remote control transmitter having a programming mode and a controlling mode, comprising memory means for storing a predetermined maximum number of remote control codes, a keypad for selecting a one of the stored remote control codes when the remote control transmitter is in the controlling mode, the keypad operatively connected to a transmitting device for transmitting remote control signals corresponding to the selected remote control code to the electrically device, means for inputting remote control codes to the memory means only when the remote control transmitter is in programming mode, and means for selectively permitting the remote control transmitter to be placed in programming mode.

Preferably, the programmable remote control transmitter has a means for selectively permitting the remote control transmitter to be placed in programming mode which comprises a locking mechanism integral the programmable remote control transmitter and a removable key.

Preferably, the programmable remote control transmitter may control a television receiver.

Preferably, a programmable remote control transmitter is provided such that each key on the keypad corresponds to a unique one of the stored remote control codes.

Preferably, the programmable remote control transmitter which has a maximum number of six remote control codes.

Preferably, the programmable remote control transmitter further comprises keys which are specifically assigned to control the on and off function of the electric device.

Preferably, the programmable remote control transmitter has means for controlling the on function of the electric device which is operatively connected to the means for transmitting the remote control signal such that immediately following the transmission of the remote control signal the electric device is placed in the "on" mode, a second remote control signal is transmitted corresponding to a specified one of the remote control codes stored in the memory means.

Preferably, the programmable remote control transmitter has a keypad which is of a large size such that operation of the remote control is easily carried out by children.

Preferably, the programmable remote control transmitter has a means for inputting remote control codes comprising a means for receiving signals from a second remote control transmitter and means for storing such signals in the memory means.

Preferably, the programmable remote control transmitter has a battery compartment which is lockable and whose key is also used to switch the transmitter from programming to controlling mode.

Advantages of the present invention are: a programmable remote control transmitter is provided which stores a predetermined number of remote control codes and which may only be reprogrammed when the remote control transmitter is placed in programming mode, and for which key access is required to place the remote control transmitter in programming mode.

BRIEF DESCRIPTION OF THE DRAWINGS

A detailed description of the preferred embodiment is provided herein below with reference to the following drawings, in which.

Figure 1:
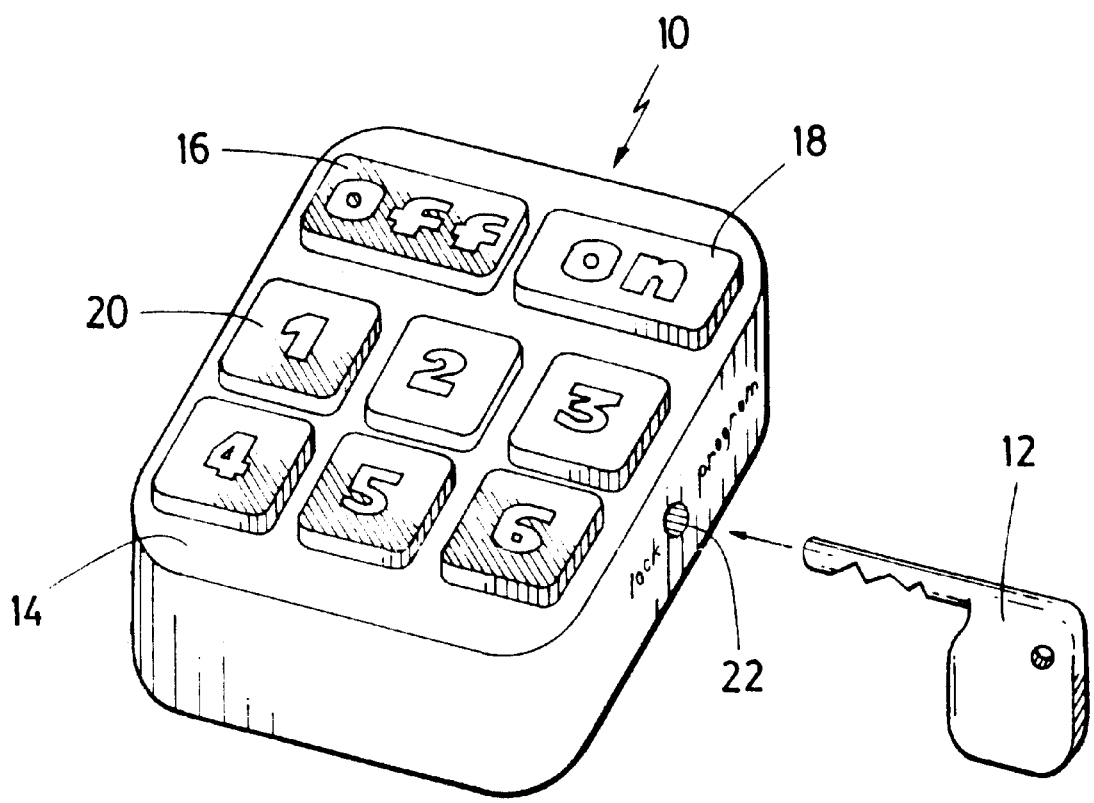
FIG. 1, in a perspective view, illustrates a programmable remote control transmitter in accordance with the preferred embodiment of the present invention.

In the drawings, the preferred embodiment of the invention is illustrated by way of example. It is to be expressly understood that the description and the drawings are only for the purpose of illustration and as an aid to understanding, and are not intended as a definition of the limits of the invention.

DETAILED DESCRIPTION OF THE PREFERRED EMBODIMENT

In FIG. 1, a programmable remote control transmitter of the preferred embodiment of the invention is shown in a perspective view. The programmable remote control transmitter 10 has an associated key 12. A keypad 14 is provided on the upper face of the remote control transmitter. The keypad 14 has an off button 16 and an on button 18 as well as six numerically marked buttons 20. A locking mechanism having a keyhole 22 is provided in the side of remote control transmitter 10.

Figure 2:
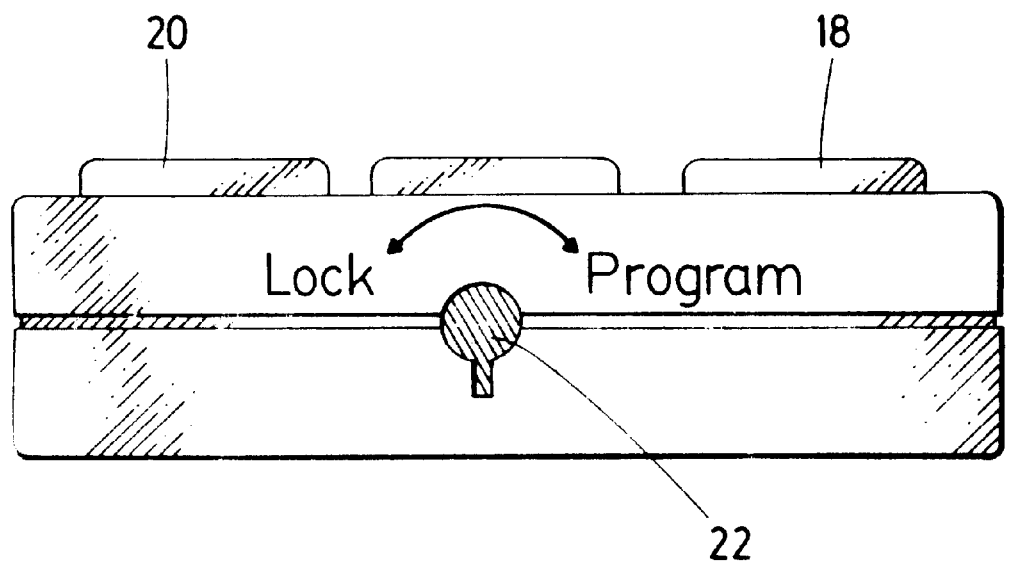
FIG. 2, in a side elevation view, illustrates the programmable remote control transmitter of FIG. 1.

Turning to FIG. 2, the remote control transmitter of FIG. 1 is shown in a side elevation view showing the side portion of the transmitter having keyhole 22. On button 18 is shown in profile, as are two of the numeric key pad buttons 20.

Figure 3:
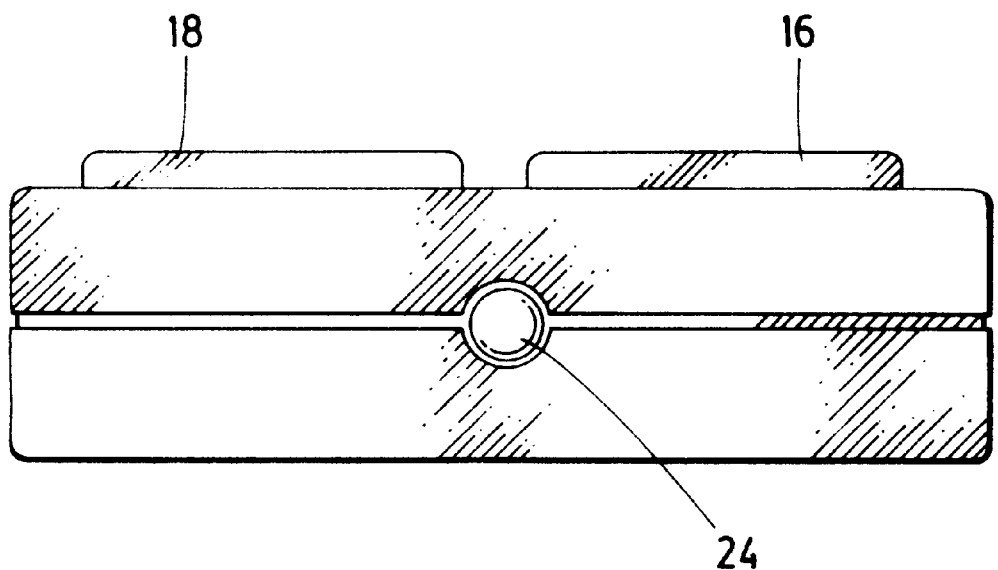
FIG. 3, in a front elevation view, illustrates the programmable remote control transmitter of FIG. 1.

FIG. 3 shows the remote control transmitter of FIG. 1 in a front elevation view. Off button 16 and on button 18 are shown in profile. Infrared transmitter/receiver 24 is shown located on the front vertical panel of the remote control transmitter.

Figure 4:
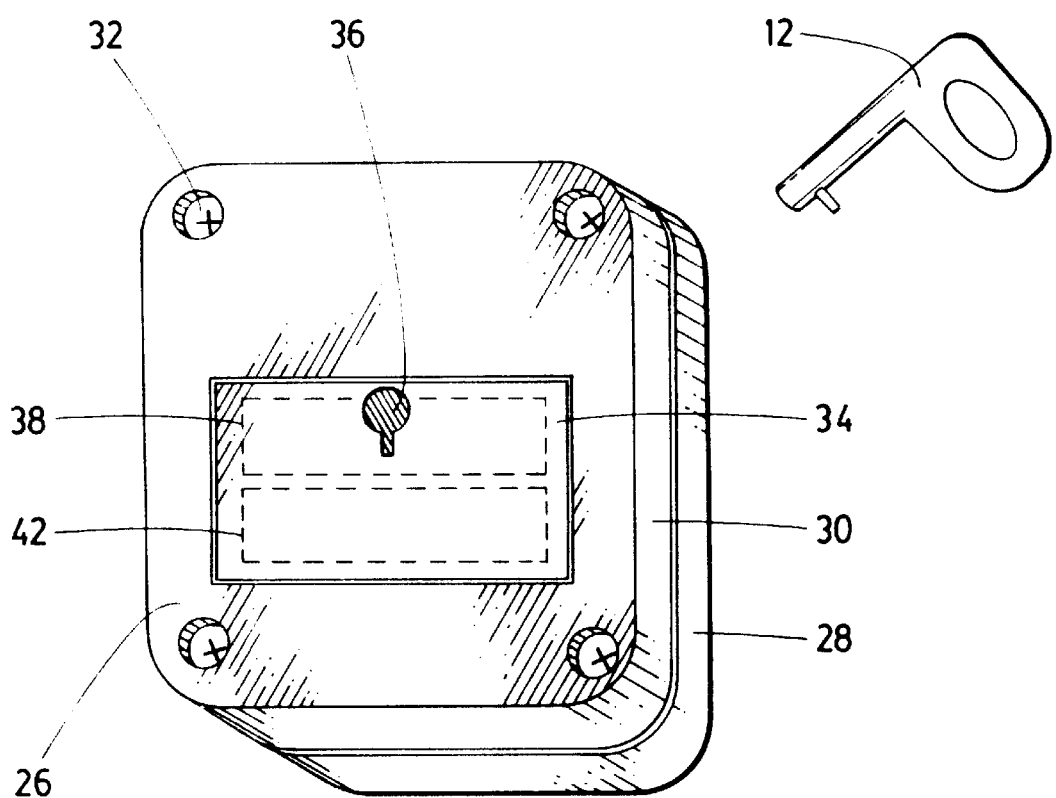
FIG. 4, in a perspective view, illustrates the bottom surface of the programmable remote control transmitter of FIG. 1.

FIG. 4 shows the bottom surface 26 of the remote control transmitter of FIG. 1 in a perspective view. The body of the remote control transmitter has top portion 28 and bottom portion 30 which are fastened together by screws 32. The remote control transmitter has a battery compartment panel 34 which has lock 36. Behind the panel 34 are located batteries 38, 42, shown in dotted outline in FIG. 4.

Figure 5:
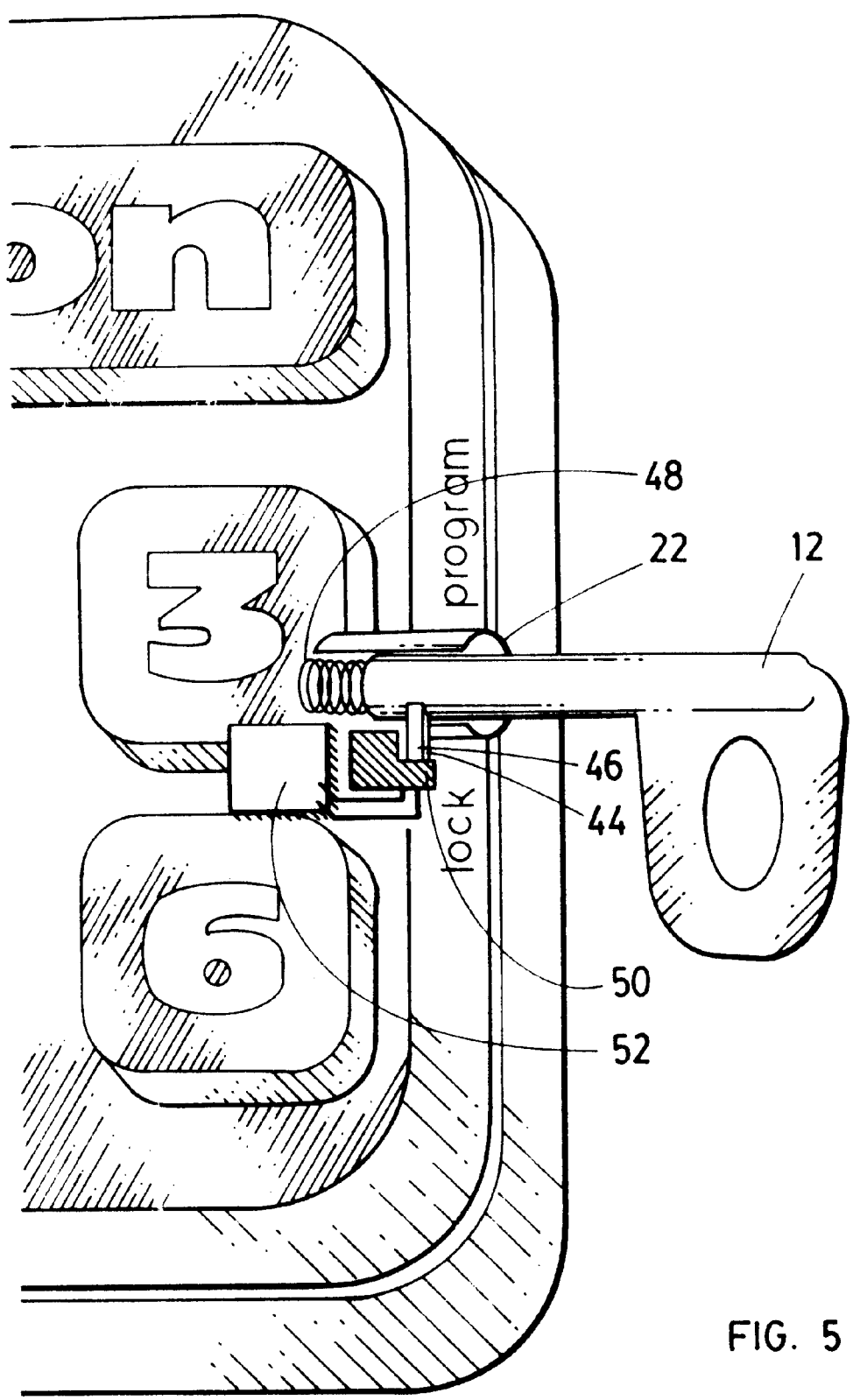
FIG. 5, in a partial cut-out perspective view, illustrates the locking/mode switching mechanism of the programmable remote control transmitter of FIG. 1.

FIG. 5 shows the locking/mode switching mechanism of the remote control transmitter of Figure in a partial cut-out perspective view. Key 12 is shown in keyhole 22. Keyhole 22 has a radially extending slot 44. Bit 46 of key 12 is able to be inserted into slot 44. Spring 48 is seated at the end of keyhole 22. Switch 50 is located having a trip mechanism in slot 44. Switch 50 is connected to the electronic circuitry of the remote control transmitter, shown symbolically in FIG. 5 as stylized computer chip 52.

In operation, the remote control transmitter of the invention is put in programming mode by key 12 being inserted in keyhole 22 and by the key then being turned to the programming position (corresponding to the "program" label adjacent to keyhole 22). While the key 12 is turned to the programming position, a second remote control transmitter (usually the one which has been provided by the manufacturer of a particular television set) is placed facing the remote control transmitter 10 such that the transmitting window of the manufacturer's remote control transmitter (not shown) is facing infrared transmitter/receiver 24 of remote control transmitter 10. One of the six numeric keys 20 is depressed on the remote control transmitter 10 while at the same time the manufacturer's remote control transmitter is manipulated in the way that normally selects a desired channel on the television set.

The remote control transmitter 10 reads the signal from the manufacturer's remote control transmitter and saves the signal as a remote control code in the memory of the remote control transmitter 10. The circuitry to accomplish the function of reading and storing such signals and codes is well-known in the art.

While the key 12 is in the programming position, this procedure may be repeated for other buttons in the numeric keypad 20. Thus a predetermined number of remote control codes (in the case of the preferred embodiment up to six) are stored in the memory of remote control transmitter 10. Multiple buttons may also be programmed with the same remote control code. In this way the device may restrict access to fewer than six channels. The key 12 is then turned to the position corresponding to the "lock" label on the remote control transmitter 10 and removed.

Placing bit 46 of key 12 in slot 44 can only be accomplished by exerting a force against the spring 48, shown in FIG. 5. Bit 46 will be inserted in slot 44 and will engage switch 50. By engaging switch 50, circuitry 52 of the programmable remote transmitter will be placed in controlling mode or programming mode described below.

When the lock is in the "lock" position, it is no longer possible to program the remote control transmitter 10 to save further remote control codes in the memory. Switch 50 interacts with circuitry 52 so as to cause the circuitry to no longer enable programming of the remote transmitter to occur. Switch 50 is a toggle switch. The circuitry which permits this selective operation of the device is well-known in the art. When the key is removed from the remote control transmitter 10 after having been in the "lock" position, the device is in "controlling" mode.

A similar procedure is carried out to ensure that the proper codes for the on and off buttons 18, 16 are stored in the memory of the remote control transmitter 10. Likewise, one or more of the numeric buttons 20 may be reprogrammed at a later date to change the codes associated with the one or more buttons.

As referred to above, when the lock of the remote control transmitter is in the "lock" position, the remote control transmitter 10 is said to be in "controlling mode". When in controlling mode it is possible to turn the television set off and on using off and on buttons 16 and 18, respectively. In addition, the remote control code stored in the memory may be accessed using one of the six buttons 20. For each remote control code stored in memory a single button is able to access the remote control code and result in a remote control signal being transmitted from infrared transmitter/receiver 24 to the television set to be controlled.

As will be apparent, this device is appropriate for children from two years of age and up. In the preferred embodiment the remote control transmitter 10 is manufactured of a shock-resistant plastic material with brightly coloured housing and a large colorful keypad 14.

According to the preferred embodiment, when the on button 18 is depressed, circuitry in the remote control transmitter 10 automatically transmits through transmission infrared transmitter/receiver 24 a remote control signal corresponding to the remote control code stored in association with the "1" button of the numeric buttons 20. This prevents children from using the remote to turn on and watch a non-programmed channel on a television which has been left by another user tuned to a channel not suitable for children. Circuitry to provide such a function is well-known in the art.

A further element of the preferred embodiment of the invention is that the remote control transmitter will prevent a child from changing channels too rapidly. If the number of channels selected within a given time period exceeds a specific limit, the remote will prevent further changes during a "time out".

A further aspect of the preferred embodiment locks batteries into the remote control transmitter 10. As shown in FIG. 5, batteries 38, 42 are located behind panel 34. A locking mechanism 36 is provided which is operable by key 12. Thus the same key which operates the lock/switching mechanism is used to lock batteries 38, 42 into the device.

In summary, a remote control transmitter is provided which enables a parent or other caregiver to program a specific number of remote control codes into a remote control transmitter in order to restrict the television viewing of a child, while permitting the child to choose between a certain number of permitted alternatives.

Other variations and modifications of the invention are possible. For example, the number of remote control codes which may be programmed into the remote control transmitter may be fewer or greater than six. All such modifications or variations are believed to be within the sphere and scope of the invention as defined by the claims appended hereto.

I claim:

1. A programmable remote control transmitter having a programming mode and a controlling mode for controlling an electrical device, said transmitter comprising memory means for storing a predetermined maximum number of remote control codes, a keypad for selecting one of the stored remote control codes when the remote control transmitter is in said controlling mode, with the keypad operatively connected to a transmitting device for transmitting remote control signals corresponding to the selected remote control code to said electrical device, keypad keys for controlling the on and off functions of said electric device, means for inputting remote control codes to said memory means only when the remote control transmitter is in said programming mode, and means for selectively permitting the remote control transmitter to be placed in said programming mode comprising a locking mechanism integral with the programmable remote control transmitter and a removable key, wherein said keypad key controlling the on function is operatively connected to said transmitting device for transmitting remote control signals such that immediately following the transmission of the remote control signal to turn, on the electrical device a second remote control signal is transmitted corresponding to a specified one of the remote control codes stored in said memory means.

2. The programmable remote control transmitter of claim 1 wherein the electric device is a television receiver.

3. The programmable remote control transmitter of claim 1 in which each key on the keypad corresponds to a unique one of the stored remote control codes.

4. The programmable remote control transmitter of claim 1 in which the means for inputting remote control codes comprises a means for receiving signals from a second remote control transmitter and means for storing such signals in the memory means.

5. The programmable remote control transmitter of claim 2 in which the means for inputting remote control codes comprises a means for receiving signals from a second remote control transmitter and means for storing such signals in the memory means.

6. The programmable remote control transmitter of claim 1 further comprising a battery compartment for at least one dry cell battery, the compartment having a cover and an operatively connected locking mechanism for locking the panel in place over the one or more batteries, the locking mechanism being operable by the removable key.

* * * * *